June 3, 1930.  M. C. SPENCER  1,761,159
ELECTRIC MOTOR
Filed Sept. 13, 1928    2 Sheets-Sheet 1

Inventor,
Millard Cole Spencer,
By Samuel W. Balch
Attorney.

Inventor,
Millard Cole Spencer,
By Samuel W. Balch
Attorney.

Patented June 3, 1930

1,761,159

UNITED STATES PATENT OFFICE

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY

ELECTRIC MOTOR

Application filed September 13, 1928. Serial No. 305,684.

The object of this invention is to provide an efficient electric motor of simple construction, operating from single-phase alternating current, and designed to rotate a shaft requiring small power at low speed, as for example, the shaft of a phonograph motor.

In the accompanying two sheets of drawings which form a part of this description, Figure 1 is an elevation of a motor which embodies this invention together with the rotatable support for a disk phonograph record.

Figure 1:
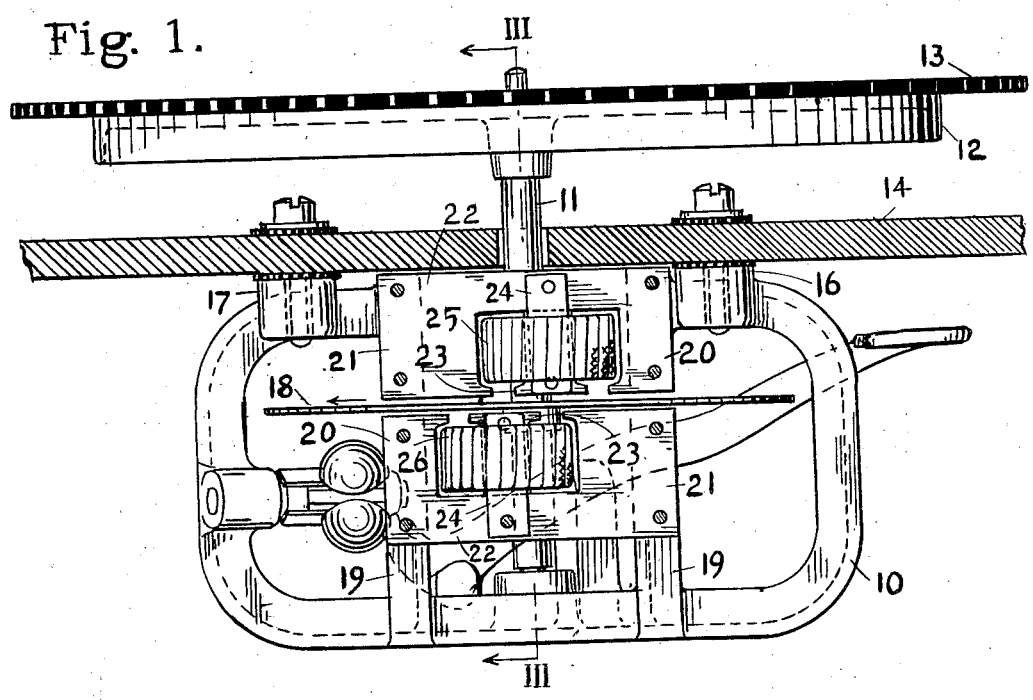
Figure 2:
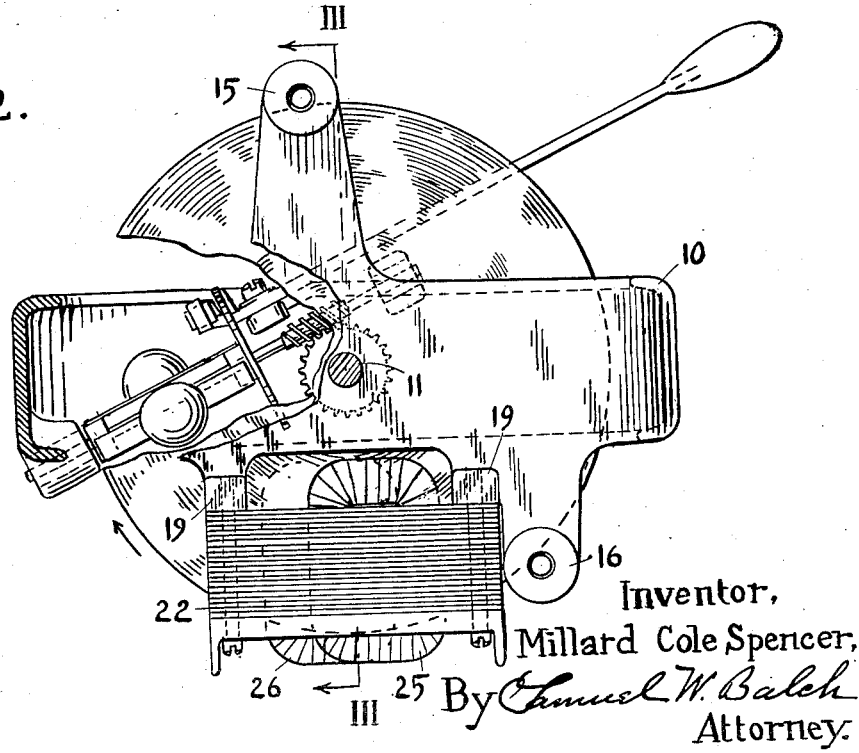
Fig. 2 is a top view of the motor, omitting the support for the record, and breaking away parts of the frame and disk armature.
Figure 3:
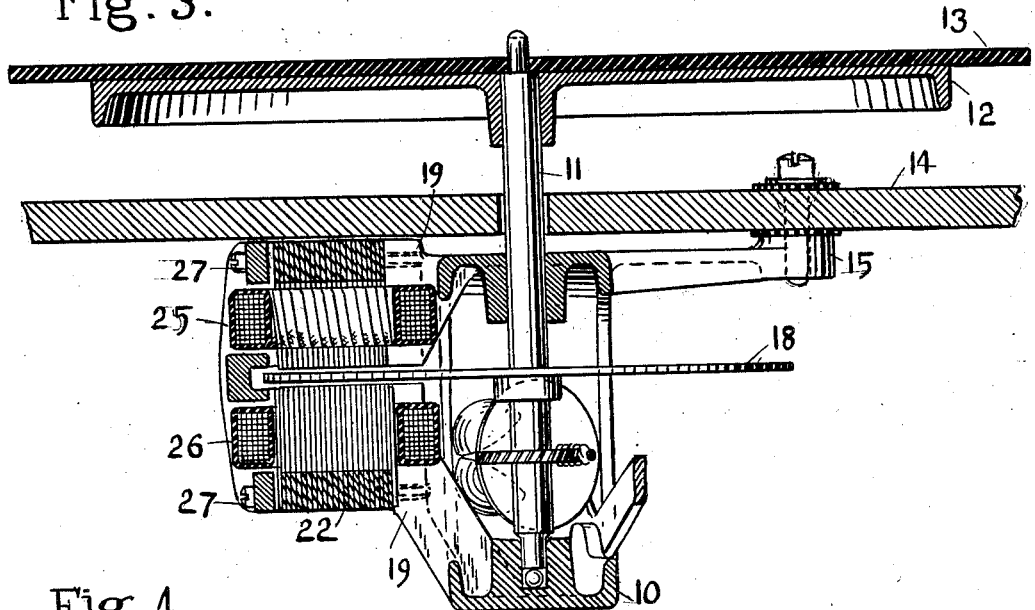
Fig. 3 is a vertical section on the line III—III of Figs. 1 and 2.
Figure 4:
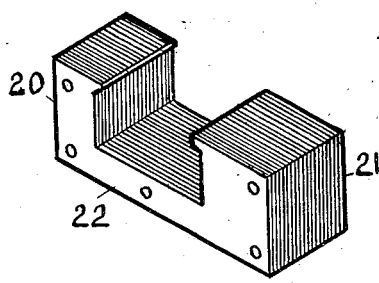
Fig. 4 is an isometric view of the portion of the stator core member which carries the end poles.
Figure 5:
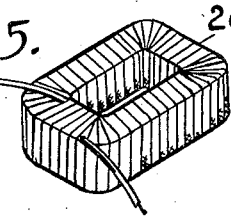
Fig. 5 is an isometric view of a formed coil.
Figure 6:
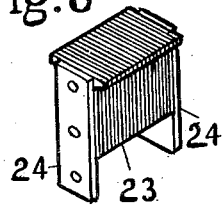
Fig. 6 is an isometric view of an intermediate pole.
Figure 7:
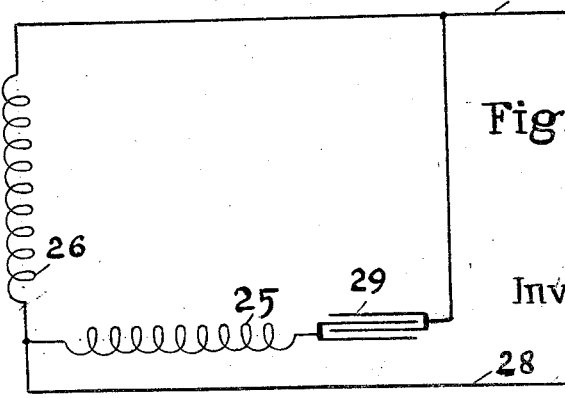
Fig. 7 is a diagram of the circuit connections.

The motor comprises a stator frame 10 which carries a vertical shaft 11. On the shaft is the disk support 12 for a phonograph record 13. The shaft passes through the top 14 of the phonograph box and the motor frame is attached to the underside of this top by screws through lugs 15, 16, 17. The shaft carries a disk rotor 18 of electrical conducting material as copper, a suitable diameter being six and one-quarter inches, and a suitable thickness being one-sixteenth of an inch for a phonograph motor. The frame has two ribs 19, 19, each having aligned parts above and below the disk rotor and between the opposed ends of which the disk rotor turns. There are two like stator core members, each consisting of a main laminated portion with a narrow end pole 20 and a wide end pole 21 and a connecting portion 22, together with an intermediate separated laminated pole 23 which is connected to the main laminated portion by straps 24, 24. The poles have expanded faces of greater areas than their sections and the openings of the slots are thereby narrowed. The cores are magnetized by coils 25, 26 which for convenience of manufacture are pre-formed, that is wound to the required shapes and taped before assembling with the cores. They are then passed into the spaces between the end poles of the main laminated portions and when in place the intermediate separate laminated poles are passed through the coils, set in place and the ends of the straps are riveted to the main portions. Pins 27, 27, which may be either screws or rivets, pass through holes along the margins of the end poles and through holes in line on the two aligned parts of each rib of the stator frame.

The cores are reversed so that the narrow end pole of each core member opposes the wide end pole of the other core member, and the cores are so proportioned that this brings the opening between poles of each core member opposite poles of the other core member.

Single-phase alternating current is supplied from leads 28, 28. The coils are connected between the leads preferably in parallel, one of the coils being connected directly and the other through a condenser 29, by which its phase is advanced. The condenser is conveniently of three microfarads capacity and a suitable number of turns for the coil in series with the condenser is 2400. A suitable number of turns for the direct connected coil is 1800, but it is not essential that the numbers of turns in the two coils should be different.

I claim,—

An electric motor comprising a disk rotor, a pair of stator core members each consisting of a main laminated portion with poles having expanded faces at each end and an intermediate separate laminated pole, means for attaching the intermediate pole to the main portion, the core members being disposed on opposite sides of the rotor with the spaces between the poles of each member opposite poles of the other member, formed magnetizing coils surrounding the intermediate poles, and means for supplying alternating current in displaced phase to the coils.

MILLARD COLE SPENCER.